(12) United States Patent
Fujii et al.

(10) Patent No.: US 6,678,574 B2
(45) Date of Patent: Jan. 13, 2004

(54) METHOD FOR PRODUCING SUSPENSION PARTS OF ALUMINUM ALLOY

(75) Inventors: Takumi Fujii, Inabe-gun (JP); Koji Takeuchi, Inabe-gun (JP); Hiroyuki Tsutsumi, Inabe-gun (JP); Yoshiya Inagaki, Inabe-gun (JP); Atumi Fukuda, Inabe-gun (JP)

(73) Assignee: Kobe Steel, Ltd., Kobe (JP)

( * ) Notice: Subject to any disclaimer, the term of this patent is extended or adjusted under 35 U.S.C. 154(b) by 197 days.

(21) Appl. No.: 09/972,940

(22) Filed: Oct. 10, 2001

(65) Prior Publication Data

US 2002/0062163 A1 May 23, 2002

(30) Foreign Application Priority Data

Oct. 11, 2000 (JP) .......................... 2000-309997
Mar. 21, 2001 (JP) .......................... 2001-079807

(51) Int. Cl.[7] .............................................. G06F 19/00
(52) U.S. Cl. ......................... 700/145; 29/897.2; 72/340
(58) Field of Search ............................... 700/145–150, 700/156, 117; 72/340; 29/897.2

(56) References Cited

U.S. PATENT DOCUMENTS

| | | | | |
|---|---|---|---|---|
| 4,798,077 A | * | 1/1989 | Douglas | 72/360 |
| 5,060,497 A | * | 10/1991 | Takahashi et al. | 72/68 |
| 6,053,023 A | * | 4/2000 | Landrum | 72/355.4 |
| 6,089,070 A | * | 7/2000 | Hancock et al. | 72/340 |
| 6,526,328 B1 | * | 2/2003 | Maguin et al. | 700/148 |

FOREIGN PATENT DOCUMENTS

JP     6-571     1/1994

* cited by examiner

Primary Examiner—Leo Picard
Assistant Examiner—Zoila Cabrera
(74) Attorney, Agent, or Firm—Oblon, Spivak, McClelland, Maier & Neustadt, P.C.

(57) ABSTRACT

A method for producing suspension parts via preforming the workpiece by roll forming. The sectional area and length of the workpiece are calculated. In the former step, more than one orthogonal cross-section is acquired from the suspension part of aluminum alloy, and the sectional area is converted into the area of a circle. An imaginary area is calculated by adding to the converted area an adequate amount of flash. In the latter step, a circular truncated cone is defined from two adjacent imaginary circles and the length of the imaginary center line between the two adjacent imaginary circles. A solid of revolution is defined by connecting these circular truncated cones, and the volume of the suspension part of aluminum alloy is substituted by the volume of the solid of revolution. The value obtained by dividing the sectional area of the workpiece by the volume is regarded as the-length of the workpiece.

9 Claims, 9 Drawing Sheets

METHOD FOR PRODUCING SUSPENSION PARTS OF ALUMINUM ALLOY

BACKGROUND OF THE INVENTION

1. Field of the Invention

The present invention relates to a method for producing suspension parts of aluminum alloy by roll forming as preforming and ensuing forging in multiple stages.

2. Description of the Related Arts

Weight reduction of motor vehicles is desirable for better fuel efficiency. It is achieved by making bodies and parts from aluminum alloy. Light parts of suspension arms (referred to as suspension parts hereinafter) made of aluminum alloy reduce the unsprung mass, thereby improving roadability.

In general, suspension parts are complex in shape (asymmetrical about the axis) and they require high mechanical and fatigue strength (comparable to those of steel) as well as high impact resistance. Therefore, they are made of aluminum alloy (such as A6061 and 6000 series) by forging. The process of forming suspension parts from aluminum alloy is explained in the following.

First, aluminum alloy is formed into a round bar by extrusion or casting and the round bar is cut in lengths. The thus obtained workpiece undergoes preforming so that it has a volume distribution resembling the finished product. Then, the preformed workpiece undergoes forging in three stages. In the first stage, which is called buster, the preformed workpiece is heated to a prescribed temperature and then roughly forged by using a first die. Buster is followed by trimming and reheating. In the second stage, which is called blocker, the roughly forged workpiece is forged by using a second die which is closer to the finished shape than a first die. Blocker is followed by trimming and reheating. In the third stage, which is called finisher, the workpiece undergoes finish forging with a finish die. Finisher is followed by trimming.

Preforming is carried out by using such an apparatus as disclosed in Japanese Patent Laid-open No. 571/1994. This apparatus is so designed as to insert a rod-like workpiece in a die cavity and form it under pressure with a punch and a mandrel. During preforming, the workpiece has its wall thickness adequately controlled as the mandrel is moved to a desired height. (Adjustment of wall thickness may also be accomplished by using a mandrel consisting of several sections which are individually moved up and down.)

The workpiece for suspension parts should have dimensions which are established as illustrated in FIG. 9. FIG. 9(a) shows a suspension part 7R drawn by CAD (computer aided design). Suspension part 7R has an imaginary center line CR and a cross section FR (shown in FIG. 9(b)) which has the maximum sectional area. The cross section FR is taken along the line XR—XR in the direction of arrows in FIG. 9(a). An imaginary circle PR as shown in FIG. 9(c) is defined which has a diameter DR large enough for its circular area to cover the cross section FR plus flash. This imaginary circle PR is regarded as the cross-section of the workpiece 1R as shown in FIG. 9(c). Likewise, the imaginary center line CR passing through the suspension part 7R shown in FIG. 9(a) is regarded as the length LR of the workpiece 1R.

The disadvantage of the above-mentioned conventional process for producing suspension parts of aluminum alloy is that each of the three stages for pressing or forging gives rise to a large amount of flash which has to be removed at the end of each stage. Flash removal takes such a long time that it is necessary to reheat the workpiece before it undergoes the subsequent; step. The necessity for flash trimming and reheating aggravate productivity and increase production cost.

Moreover, the above-mentioned preforming apparatus is complex in structure and operation and hence is poor in productivity. In addition, it is constructed such that flash is liable to stick to the sliding part of the die and the split of the mandrel. This leads to low metal recovery and gives low-precision products. Flash removal requires additional maintenance cost.

The workpiece IR prepared as shown in FIG. 9 has a volume much larger than that of the suspension part 7R. Therefore, it prevents material shortage in preforming and forging but causes a large amount of flash which lowers metal recovery and productivity.

OBJECT AND SUMMARY OF THE INVENTION

The present invention was completed to address the above-mentioned problem. It is an object of the present invention to provide a method for determining the dimensions of the workpiece for roll forming and a method for producing high-precision suspension parts efficiently from the workpiece. The workpiece is processed into the suspension part by preliminary roll forming and ensuring forging. Owing to its optimized shape, the workpiece gives only a minimum amount of flash without material shortage, thereby improving metal recovery and productivity.

The gist of the present invention resides in a method for producing suspension parts of aluminum alloy, said method comprising a step of preparing a workpiece for roll forming having prescribed dimensions, a step of heating said workpiece, a step of subjecting said workpiece, which has been heated, to roll forming, thereby giving a preformed workpiece, a step of subjecting said preformed workpiece to pressing (or forging) in multiple stages, thereby giving a formed product, and a step of subjecting the formed product to trimming, wherein said trimming is carried out only after the above-mentioned pressing in multiple stages has been completed.

According to the present invention, the preliminary workpiece is formed from a workpiece having prescribed dimensions by rolling for improved efficiency and operation. The pressing or forging in multiple stages is carried out such that trimming is carried out after all the stages are completed. Trimming in this way reduces operating time, and reduced operating time eliminates the necessity of reheating, which in turn reduces operating time further and production cost. In order that trimming is not required in the intermediate stages, the preformed workpiece should have an adequate shape which minimizes the amount of flash. This is easily accomplished if the preformed workpiece is prepared from a workpiece having prescribed dimensions by roll forming. Roll forming of a workpiece having prescribed dimensions to give the preformed workpiece and forging in multiple stages which needs trimming only at the last stage contribute to productivity when they are combined together.

The present invention produces its full effect when it is applied to suspension parts of aluminum alloy, because efficient and economical production is important for suspension parts to be produced in large quantities from aluminum alloy which is more expensive than iron. The present invention solves the problem with reduction of steps and improvement in metal recovery. The preforming by rolling is suitable for the workpiece for the suspension part which is comparatively thin and long and greatly varies in sectional area. Moreover, the preforming by rolling imparts grain flow in the lengthwise direction to the workpiece. This is desirable because aluminum greatly depends on grain flow for its mechanical properties (strength and toughness). After forging, the preformed workpiece with grain flow gives a suspension part which has also grain flow and hence has better mechanical properties than that obtained by pressing or forging alone. The method of the present invention may also be applied to any other parts of aluminum alloy (than suspension parts) which are comparatively thin and long and greatly vary in sectional area. Applying the method to such parts is also within the scope of the present invention.

Another gist of the present invention resides in a method for producing suspension parts of aluminum alloy as defined above, wherein the prescribed dimensions are determined by multiple steps of establishing an imaginary center line in the suspension part of aluminum alloy, acquiring plural orthogonal cross-sections perpendicular to the imaginary center line so as to be arranged along the imaginary center line, calculating a sectional area of the cross-sections, defining imaginary circles each having an imaginary area which is equal to the sectional area of the orthogonal cross-section plus a preliminarily established amount of flash, defining the imaginary area between said imaginary circles by interpolation, integrating said imaginary areas, thereby calculating the imaginary total volume of the suspension part of aluminum alloy, and obtaining the sectional area of the workpiece of roll forming based on the imaginary circle having the maximum area among said imaginary circles and dividing said total volume by said sectional area, thereby giving a value which is regarded as the length of the workpiece for roll forming.

The workpiece for roll forming which has dimensions determined as mentioned above permits efficient rolling. In addition, the workpiece for roll forming which has a volume plus an adequate amount of flash minimizes flash such that trimming is necessary only after the last stage of forging. Moreover, assuming the area of an imaginary circle having the maximum area is effective in preventing material shortage from occurring in the part where the sectional area of the suspension part is largest. According to the present invention, it is possible to determine accurately and rapidly the dimensions of the workpiece for roll forming.

When the dimensions of the workpiece for roll forming are determined, the step of defining the imaginary area between said imaginary circles by interpolation is carried out such that a circular truncated cone is formed between adjacent two imaginary circles.

When the dimensions of the workpiece for roll forming are determined, the sectional area of the workpiece for roll forming may be the maximum value of said imaginary area multiplied by a prescribed factor. The prescribed factor should preferably be 0.7 to 1.0. The factor in this range contributes to improvement in metal recovery. Incidentally, this factor has been established in consideration of the deforming characteristics of the workpiece, the entire shape of the suspension part, and the groove shape of the forming roll.

When the dimensions of the workpiece for roll forming are determined, the area of the orthogonal cross-section multiplied by a prescribed factor may be regarded as the amount of flash. In this case, the prescribed factor should preferably be 0.05 to 0.3. This factor is effective in preventing material shortage while controlling the amount of unnecessary flash.

The step of calculating the above-mentioned dimensions may be accomplished by using three-dimensional CAD data for the suspension part of aluminum alloy.

The gist of the present invention resides also in a method for producing suspension parts of aluminum alloy as defined in above, wherein the prescribed dimensions are determined by multiple steps of preparing a test piece having the volume of the workpiece, subjecting the test piece to preforming by actual roll forming and pressing (or forging) in multiple stages, decreasing the volume of the workpiece by a certain amount if trimming is necessary in the series of steps and subjecting the test piece again to preforming by actual roll forming and pressing (or forging) in multiple stages, increasing the volume of the workpiece by a certain amount if trimming is necessary in the series of steps and subjecting the test piece again to preforming by actual roll forming and pressing (or forging) in multiple stages, and repeating said steps until the prescribed conditions are satisfied.

In production of suspension parts of aluminum alloy as defined above, pressing (or forging) in multiple stages may be carried out simultaneously by using dies which are arranged side by side and mounted on the same pressing or forging machine.

According to the present invention, the workpiece for roll forming gives only at small amount of flash, so that there is no possibility of flash producing adverse effect when multiple stages of forging (such as buster, blocker, and finisher) are carried out simultaneously by using only a pressing or forging machine. Forging with dies arranged side by side contributes to efficient operation.

DESCRIPTION OF THE PREFERRED EMBODIMENTS

Figure 1:
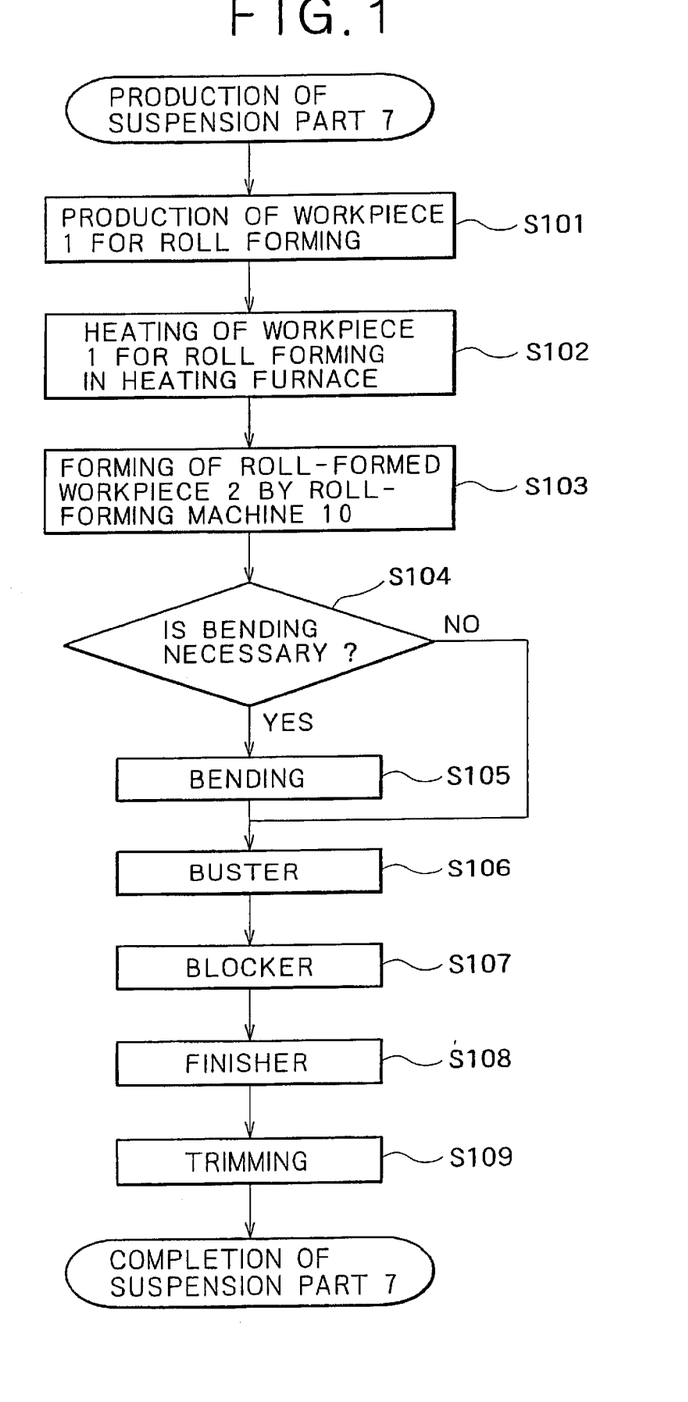
FIG. 1 is a flow chart for forging in one embodiment of the present invention.

The first embodiment: of the present invention is described with reference to the accompanying drawings. FIG. 1 is a flowchart for production of a suspension part of aluminum alloy. FIG. 2 is a schematic diagram showing how the workpiece changes in shape as the process proceeds.

As FIG. 1 shows, the entire process for producing a suspension part in this embodiment consists of the following nine steps.

Step S101 for producing a workpiece 1 for roll forming, which is shown in FIG. 1.

Step S102 for heating the workpiece 1 in a furnace.

Step S103 for roll forming (preformed forging) the heated workpiece to give it prescribed steps (2a, 2b, 2c).

Step S104 for checking the roll formed workpiece to see if it needs bending.

Step S105 for bending the roll formed workpiece if necessary.

Step S106 for performing buster (primary forging) with a press.

Step S107 for performing blocker (secondary forging).

Step S108 for performing finisher (finish forging).

Step S109 for trimming to remove flash formed by forging in steps S106 to S108.

Thus there is obtained a suspension part 7 of desired shape as shown in FIG. 2.

Each step will be described in more detail.

Step S101 is intended to form a workpiece 1 for roll forming. The first thing to do in this step is to determine the dimensions of the workpiece 1. This is accomplished by means of three-dimensional CAD (computer aided design) which will be described later. In this step, aluminum alloy (such as A6061) is made into a round rod by casting or extrusion and then the resulting round rod is cut in lengths. The cut pieces of round rod are stored in a stocker and then introduced into a heating furnace time to time.

Figure 3:
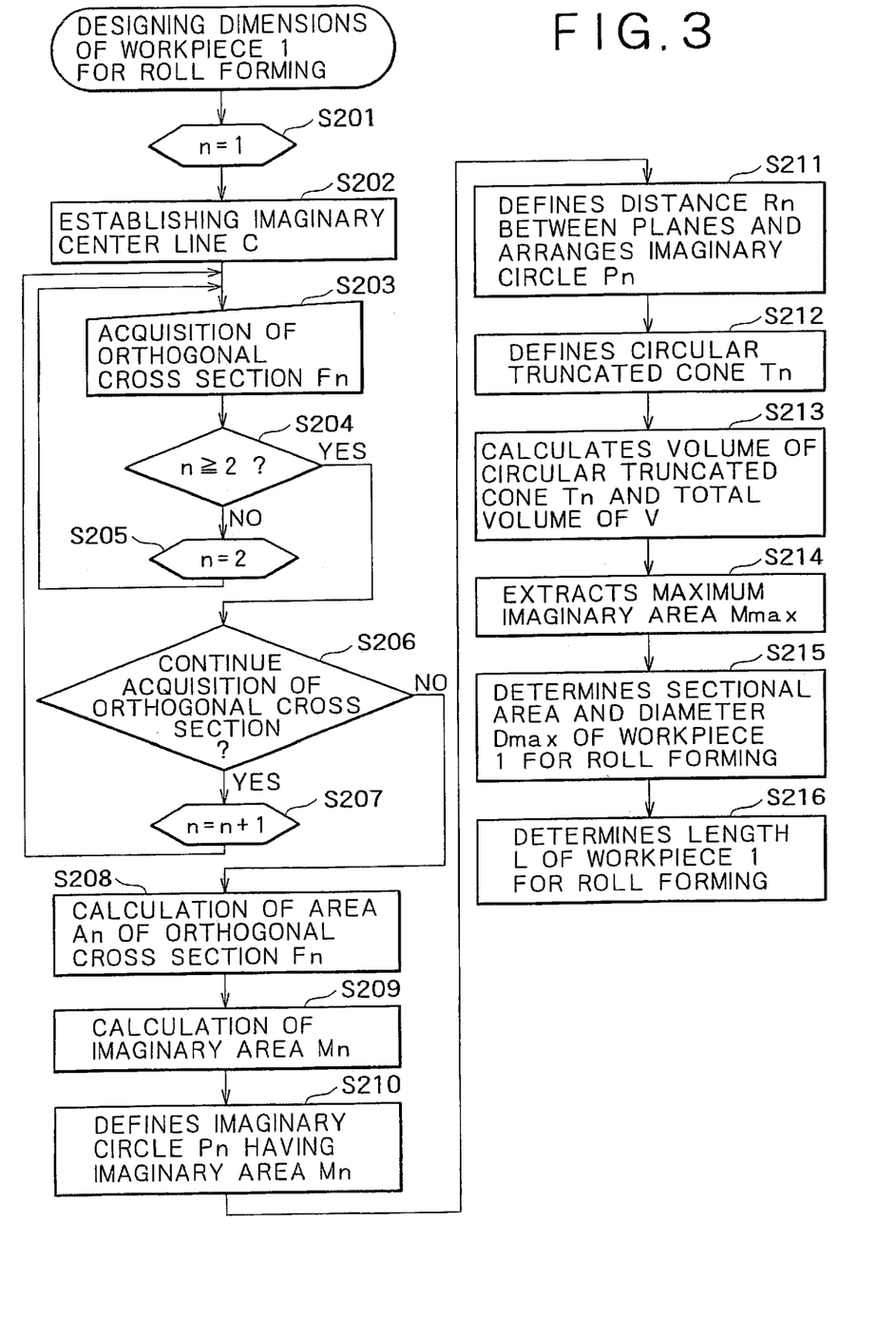
FIG. 3 is a flow chart for determining the dimensions of the workpiece for roll forming in one embodiment of the present invention.

The round rod has a diameter established in the following manner which is explained with reference to FIG. 3. Steps in the flowchart in FIG. 3 are schematically shown in FIG. 4. Incidentally, this embodiment is intended to establish five orthogonal cross-sections as shown in FIG. 4(a); however, the number of cross-sections is arbitrary (2 or more).

Figure 4A:
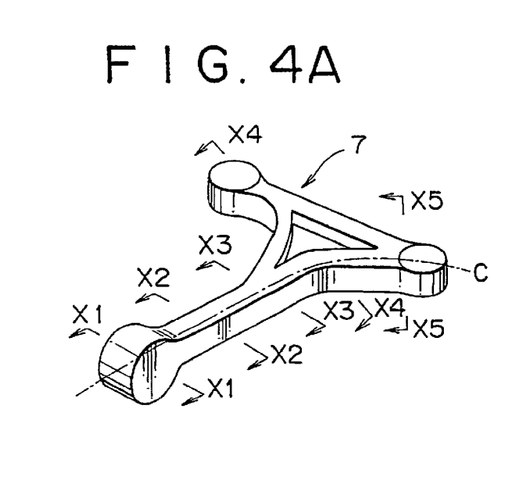
FIGS. 4A–4E is a schematic diagram showing the process of three-dimensional CAD used to form the workpiece for roll forming.

A desired suspension part 7 is shown in FIG. 4(a). Its three-dimensional data are fed into to a computer. The computer defines the section number n and substitutes 1 in the section number n (Step S201 in FIG. 3). Then the computer displays a three-dimensional drawing of the suspension part.

Figure 4B:
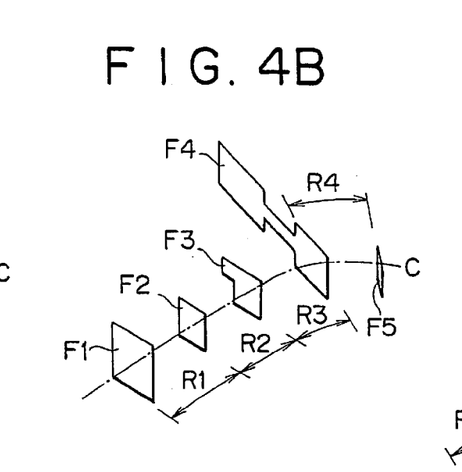
Figure 4C:
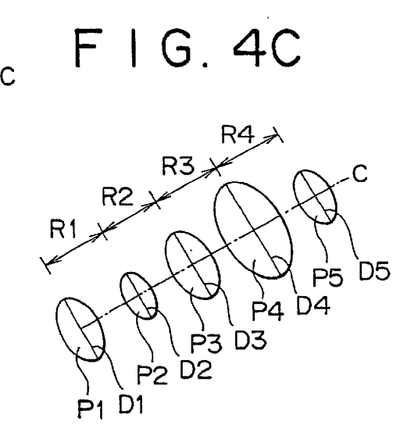

In step S202, an imaginary center line C is established in the suspension part, as shown in FIG. 4(a). In step S203, there is obtained the orthogonal cross-section F1 (Fn:n=1) along the line X1—X1 which is perpendicular to the imaginary center line C. This orthogonal cross-section F1 is one cross-section of suspension part 7 whose shape is shown in FIG. 4(b). Incidentally, the imaginary center line C may be either curved as shown in FIG. 4(a) or straight.

The orthogonal cross-section F1 alone is not enough to define the circular truncated cone T1 (Tn:n=1) to be formed later. Consequently, step S204 returns, through step S204, to step S203 to give the second orthogonal cross-section F2 (Fn:n=2). The computer assigns 2 to the acquisition number of orthogonal cross-section n in step S205.

Thus, the operator acquires the orthogonal cross-section F2 at a position a certain distance away along the imaginary center line C from the orthogonal cross-section F1. This position is at the line X2—X2 shown in FIG. 4(a). Incidentally, in FIG. 4(b), the orthogonal cross-section F2 is defined as a cross-section which is R1 away along the imaginary center line C from the orthogonal cross-section F1. (R1 is a portion of the imaginary center line.)

The step to give the orthogonal cross-section F2 advances to step S204. Step S204, in which 2 or larger number has been assigned to the acquisition number n of the orthogonal cross-section, advances to step S206.

If selection in step S206 is acquisition of the third orthogonal cross-section F3 (Fn:n=3), then the flow advances to step S207, in which the acquisition number n increases by one and becomes 3. The flow returns to step S203 for acquisition of the third orthogonal cross-section F3. See FIG. 4(b). The same procedure as mentioned above is repeated until the fourth and fifth orthogonal cross-sections F4 and F5 are acquired. See FIG. 4(b). After the fifth orthogonal cross-section F5 has been acquired, step S208 is completed, and the flow advances to step S208.

In step S208, the computer calculates the respective areas A1 to A5 (An:n=1~5) of the orthogonal cross-sections F1 to F5. In step S209, the computer calculates the imaginary areas M1 to M5 (Mn:n=1~5) by adding to the areas A1 to A5 an adequate amount of flash (explained later). In step S210, the computer defines imaginary circles P1 to P5 (Pn:n=1~5) corresponding respectively to the imaginary areas M1 to M5, and then calculates the diameters D1 to D5 of the imaginary circles.

In step S211, the computer rearranges the imaginary circles P1 to P5 such that their centers are aligned. See FIG. 4(c). The center distance of adjacent imaginary circles P1 to P5 are defined on the assumption that the imaginary center line lengths R1 to R5 are straight. For example, the center distance between the adjacent circles P1 and P2 is equal to the imaginary center line length R1 which is assumed to be straight.

Figure 4D:
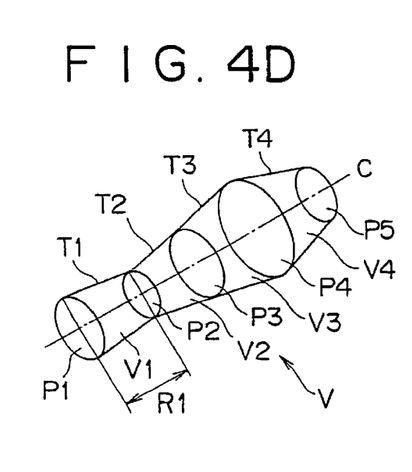

In step S212, the computer defines the circular truncated cone T1 with the imaginary circle P1, the imaginary circle P2, and the imaginary center line distance R1, as shown in FIG. 4(d). This circular truncated cone T1 has the imaginary circle P1 as the base, the imaginary circle P2 as the top, and the imaginary center line distance R1 as the height. Similarly, the circular truncated cone T2 is defined with the imaginary circles P2 and P3 and the imaginary center line length R2. The circular truncated cones T3 and T4 are defined in the same way.

The forgoing steps convert the suspension part 7 shown in FIG. 4a) into a solid of revolution consisting of circular truncated cones T1 to T4 arranged straight as shown in FIG. 4(d). The solid of revolution has a revolving center which coincides with the imaginary center line C which has been redefined as a straight line in step S211. The center distance between the imaginary circle P1 and the imaginary circle P5 is equal to the length of the line along which the imaginary center line C penetrates the suspension part 7, as shown in FIG. 4(a).

In step S213, the computer calculates the respective volumes V1 to V4 (Vn:n=1–4) of the circular truncated cones T1 to T4 and also calculates the total volume V of the individual volumes V1 to V4. The volume V1 is obtained by integrating the cross-section of the circular truncated cone T1 along the imaginary center line C. Thus, the volume of the suspension part 7 shown in FIG. 4(a) is regarded as the volume of the solid of revolution consisting of the circular truncated cones T1 to T4 arranged straight.

In step S214, the computer compares the imaginary areas M1 to M5 with one another and extracts the maximum imaginary area Mmax. In this embodiment, the area of the imaginary circle P4 is the maximum imaginary area Mmax.

In step S215, the computer determines the sectional area and diameter Dmax of the workpiece 1 for roll forming. The sectional area of the workpiece may be the maximum imaginary area Mmax extracted in step S214; however, it should preferably be the maximum imaginary area Mmax multiplied by 0.7~1.0. The sectional area obtained in this manner leads to reduction of workpiece volume and improvement in metal recovery. Incidentally, the sectional area of the workpiece 1 for roll forming should preferably be circular for easy handling and working. In this case, the diameter Dmax of the workpiece 1 is obtained from the maximum imaginary area Mmax or the maximum imaginary area Mmax multiplied by 0.7~1.0.

Figure 4E:
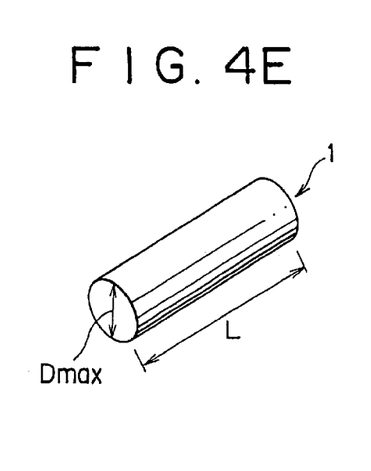

In step S216, the computer determines the workpiece length L by dividing the total volume V by the sectional area of the workpiece 1. Thus, the workpiece 1 shown in FIG. 4(e) is defined by the diameter Dmax and the length L.

The amount of flash is a value added to prevent material shortage at the time of forging by a press. It is calculated by multiplying the respective sectional areas A1 to A5 of the orthogonal cross-section F1 to F5 by a certain factor. This factor ranges from 0.05 to 0.3, depending on the shape and material of the suspension part 7 and the working machine used. A factor smaller than 0.05 leads to material shortage, and a factor larger than 0.3 leads to unnecessary flash (wasting materials and damaging dies).

As mentioned above, the sectional area of the workpiece 1 for roll forming is determined from the imaginary areas M1 to M5 which are calculated by adding an adequate amount of flash to the orthogonal cross-sections F1 to F5 of the suspension part 7. The workpiece 1 having the thus calculated diameter does not experience material shortage at the time of forging. The length L of the workpiece 1 is calculated from the total volume of the circular truncated cones T1 to T5 which have the imaginary areas M1 to M5 and the distances R1 to R5. Thus the workpiece 1 has an optimum volume which prevents excess flash at the time of forging.

Figure 2A:
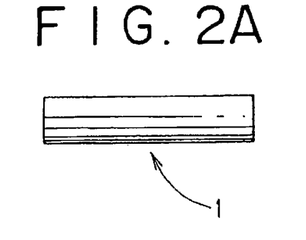
FIGS. 2A–2G is a schematic diagram showing the shape of the product obtained in each step in FIG. 1.

In step S102 shown in FIG. 1, the workpiece 1 shown in FIG. 2(a), which has been formed in step S101, is heated at a prescribed temperature in a gas furnace (which is preferable) or a furnace of any other type. For efficient heating and operation, it is desirable to handle a plurality of workpieces at one time by using a tray.

Figure 2B:
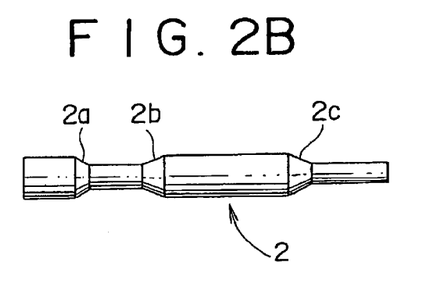
Figure 5A:
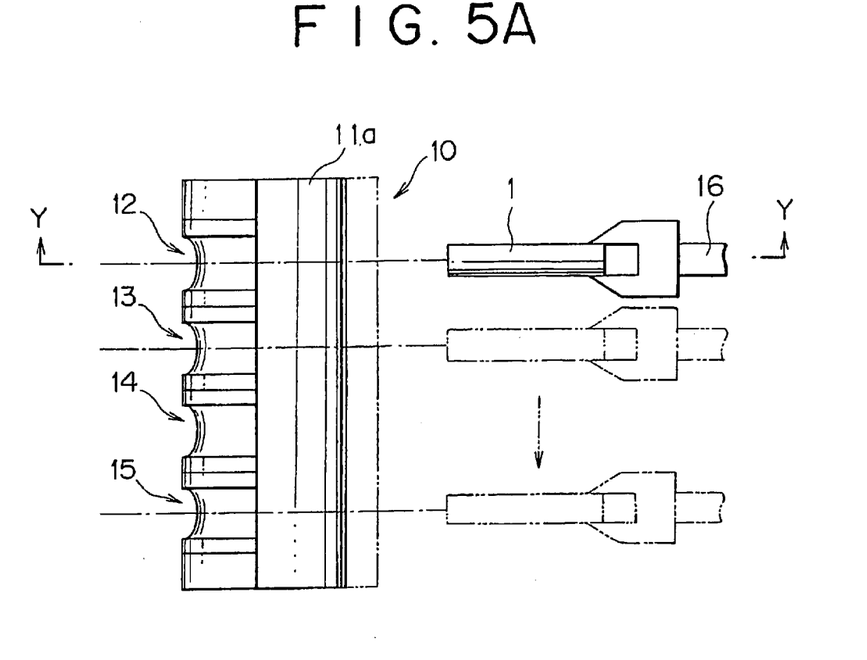
FIG. 5(a) is a plan view showing important parts of the roll-forming machine.
Figure 5B:
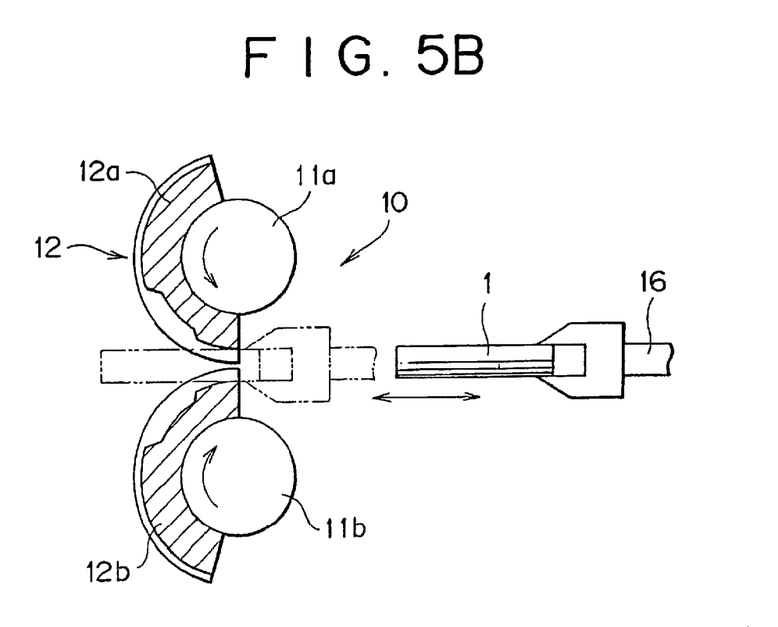
FIG. 5(b) is a sectional view taken along the line Y—Y in FIG. 5(a).

In step S103, the workpiece 1 is formed by rolling into the stepped workpiece 2 as shown in FIG. 2(b). This rolling step is explained below with reference to FIGS. 5(a) and 5(b) and FIGS. 6(a) to 6(b). FIG. 5(a) is an enlarged plan view showing important parts of the roll forming machine. FIG. 5(b) is a sectional view taken along the line Y—Y in FIG. 5(a). FIGS. 6(a) to 6(e) are schematic sectional views showing how the workpiece 1 changes in cross-section as roll-forming proceeds. Reduction in sectional area is shown.

As shown in FIGS. 5(a) and 5(b), the roll forming machine 10 consists of two rotary shafts 11a and 11b, which are arranged parallel to each other a certain distance apart, and four pairs of roll dies 12, 13, 14, and 15, which are fixed to the rotary shafts such that they face each other. The roll forming machine also has a manipulator 16 to move the workpiece 1 in synchronism with rotation of the rotary shafts 11a and 11b. Incidentally, the rotary shafts 11a and 11b of the roll forming machine 10 turn intermittently in the direction of arrow shown in FIG. 5(b), and the roll dies 12 to 15 also turn intermittently accordingly.

Figure 6A:
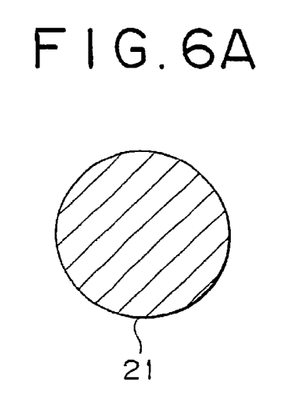
FIGS. 6A–6E is a schematic diagram showing how the cross-section of the workpiece changes during roll forming.
Figure 6B:
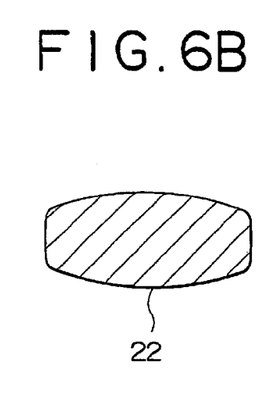

The manipulator 16 inserts the workpiece 1 into the position indicated by broken lines in FIG. 5(b) while the rotary shafts 11a and 11b are turning through the angle in which the roll dies 12 do not exist. As the rotary shafts 11a and 11b turn, the upper and lower roll dies 12a and 12b come to the position shown in FIG. 5(b). Then, the manipulator 16 withdraws the workpiece 1 to the position indicated by solid lines in FIG. 5(b) in synchronism with rotation of the roll dies. Rolling in this manner causes the shape of the upper and lower roll dies 12a and 12b to be transferred to the workpiece 1. As the result, the workpiece 1 has a horizontally elongated oval cross-section 22 as shown in FIG. 6(b). The sectional area is reduced compared with FIG. 6(a).

Figure 6C:
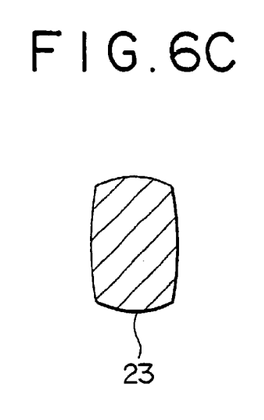

Then, the manipulator 16 moves sideward from its first position (indicated by solid lines in FIG. 5(a)) to its second position (indicated by broken line in FIG. 5(a)) at which the workpiece 1 aligns with the roll die 13. At this new position, the manipulator rotates the workpiece 1 through 90° about its long axis. The manipulator inserts the workpiece 1 between the rotary shafts 11a and 11b and then withdraws it in synchronism with rotation of the second roll die 13 in the same way as mentioned above. This procedure causes the shape of the second roll die to be transferred to the workpiece 1. As the result, the workpiece 1 has a vertically elongated oval cross-section 23 as shown in FIG. 6(c).

Figure 6D:
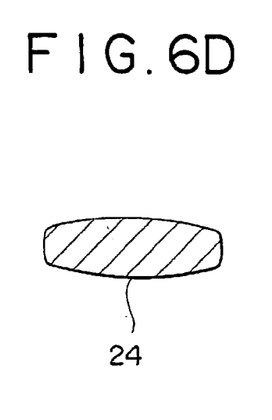

The manipulator 16 is moved sideward again to the position where the workpiece 1 aligns with the third roll die 14 in the same way as mentioned above. The workpiece 1 undergoes forming by the third roll die 14. The thus formed workpiece 1 has a cross-section 24 as shown in FIG. 6(d). This cross-section 24 is much smaller than the oval cross-section 22, and hence the workpiece becomes longer accordingly.

Figure 6E:
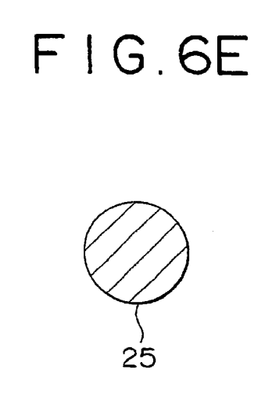

The workpiece 1 undergoes forming by the fourth roll die 15, so that it has a cross-section 25 with a prescribed sectional area as shown in FIG. 6(e). In this way there is obtained the workpiece 2 which has steps 2a, 2b, and 2c as shown in FIG. 2(b).

The sequential forming by roll dies 12 to 15 mentioned above makes the workpiece 1 to have a wrought structure, which leads to the finished suspension part 7 having an improved quality.

Figure 2C:
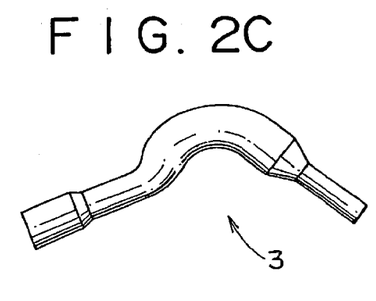
Figure 2D:
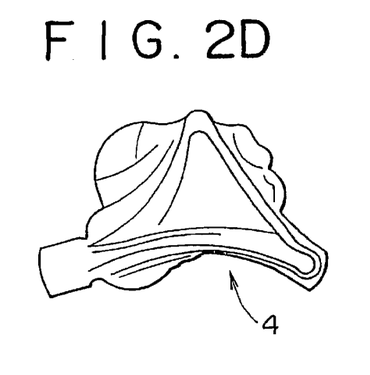
Figure 7A:
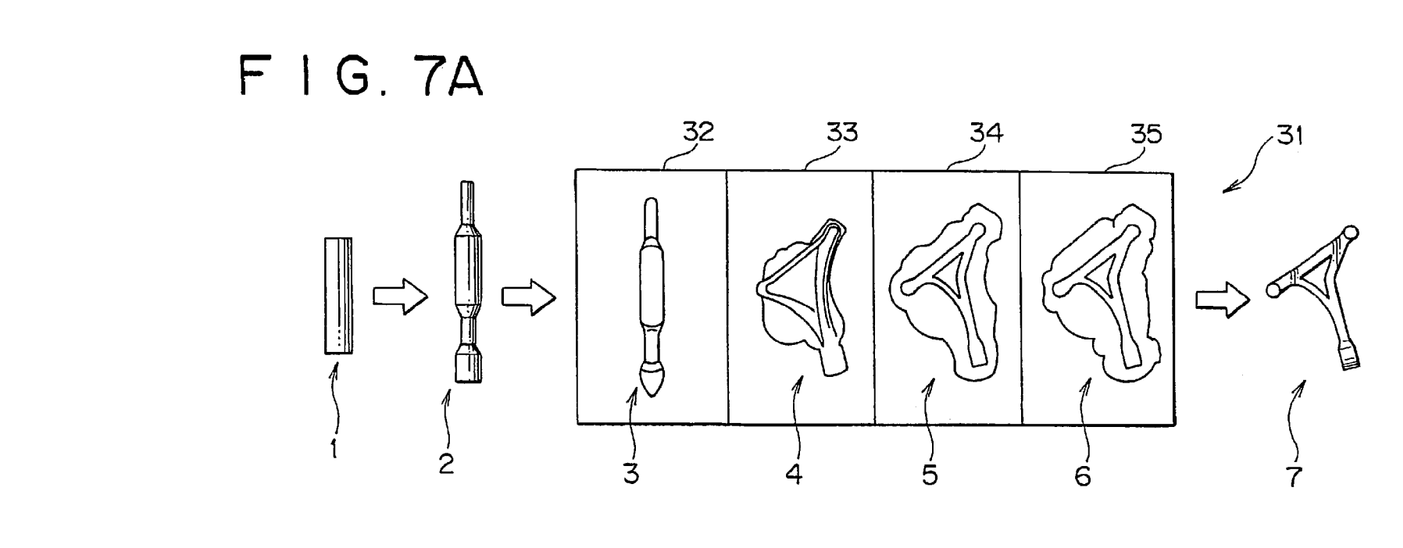
FIGS. 7A–7B is a plan view (a) and a sectional view (b) of the pressing machine used in one embodiment of the present invention.
Figure 7B:
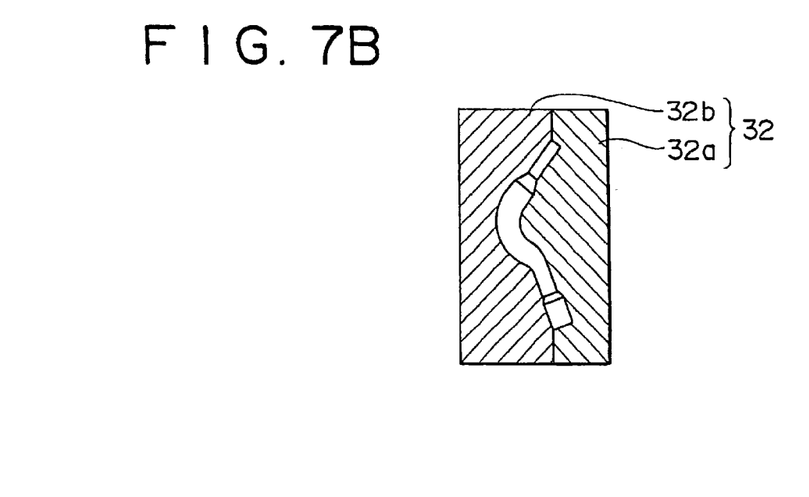

Step S105 for bending is accomplished by using a press die 31 shown in FIG. 7. The press die 31 consists of a die 32 for bending, a first forging die 33 for buster, a second forging die 34 for blocker, and a finish forging die 35 for finisher, which are arranged side by side. Incidentally, FIG. 7(a) is a plan view showing the lower halves of the dies 32 to 35. The die 32 for bending, for example, consists of a male upper die 32a and a female lower die 32b as shown in FIG. 7(b). To start forging operation, the stepped workpiece 2 prepared in step S104 is placed in the lower die 32b by a robot arm (not shown). As the upper die 32a is lowered gradually, the stepped workpiece is bent into a preformed workpiece 3 as shown in FIG. 2(c) and FIGS. 7(a) and 7(b). Incidentally, this bending step may be carried out by using a bending machine which is separate from the dies 33 to 35.

Steps S106 to S108 for buster, blocker, and finisher are accomplished continuously by using the press dies 33 to 35 shown in FIG. 7.

Buster is a step to press the preformed workpiece 3 (shown in FIG. 2(c) and FIGS. 7(a) and 7(b) by using the first forging die 33. In this step, the preformed workpiece 3 is removed from the bending die 32 by a robot arm and then placed on the lower half of the first forging die 33, with its longer axis turned through 90°. As the upper die (not shown) is lowered, the preformed workpiece 3 is formed into a primary press-formed product 4 shown in FIG. 2(d) and FIG. 7.

Figure 2E:
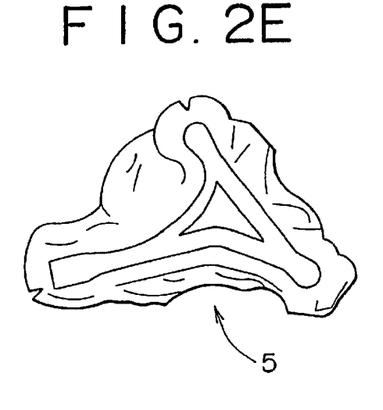

Blocker is a step to transfer by a robot arm the primary press-formed product 4 from the first forging die 33 to the second forging die 34 for pressing. This step gives the secondary press-formed product 5, as shown in FIG. 2(e), which is close to the final shape.

Figure 2F:
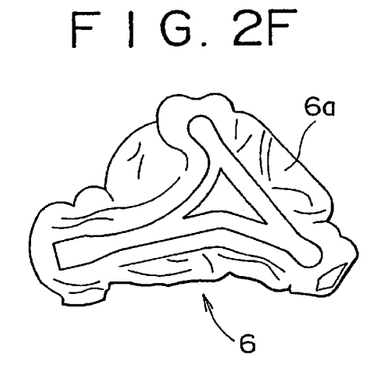

Blocker is followed by finisher, which is a step to transfer by a robot arm the secondary press-formed product 5 from the second forging die 34 to the finish forging die 35 for pressing. This step gives the final press-formed product 6 as shown in FIG. 2(f).

The press die 31 is mounted on a press or forging forming machine (not shown) so that the steps of bending, buster, blocker, and finisher are carried out simultaneously. Such operation is possible because the workpiece 1 with optimal dimensions gives so small an amount of flash at each step (S104 to S108) as to be transferred to the subsequent step without trimming. Moreover, the dies 32 to 35 are arranged side by side because there is no possibility that flash in one die affects its adjacent die. The simultaneous pressing operation with the dies 32 to 35 is possible because the amount of flash is so small as to reduce the force required for pressing.

It is preferable to arrange the dies 33 to 35 side by side for simultaneous pressing, considering the case where bending is not performed. It is also possible to carry out the steps of buster, blocker, and finisher by using individual separate dies. It is also possible to combine two or three dies among the dies 32 to 35 including bending (steps S105 to S108) defending on the power of the press-forming machine.

Figure 2G:
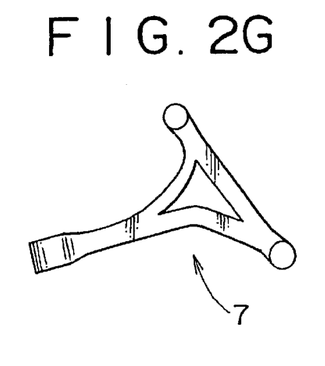

Step S109 is intended for trimming flash 6a which has resulted from pressing in steps S106 to S108. This step employs a trimming machine. After trimming, the suspension part 7 shown in FIG. 2(g) is completed.

The above-mentioned embodiment is characterized in that the preformed workpiece 3 has such dimensions as to give a minimum amount of flash in pressing steps. Therefore, the workpiece can be transferred through buster, blocker, and finisher without the necessity of trimming. Trimming is necessary only after finisher. This contributes to improved metal recovery and productivity.

Figure 9A:
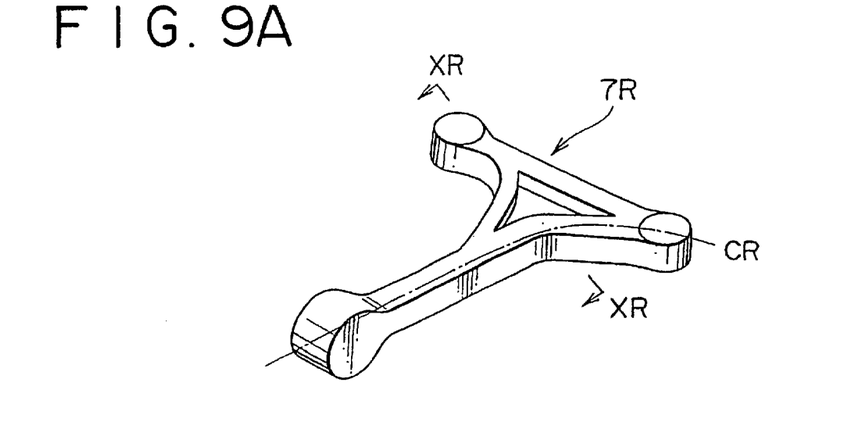
FIGS. 9A–9D is a diagram to explain the conventional method of determining the dimensions of the workpiece for roll forming.
Figure 9B:
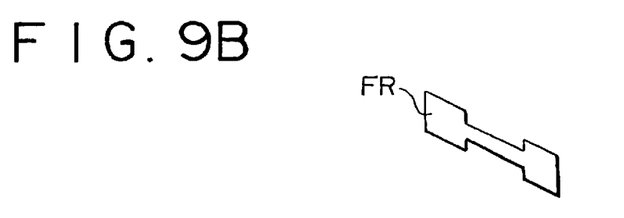
Figure 9C:
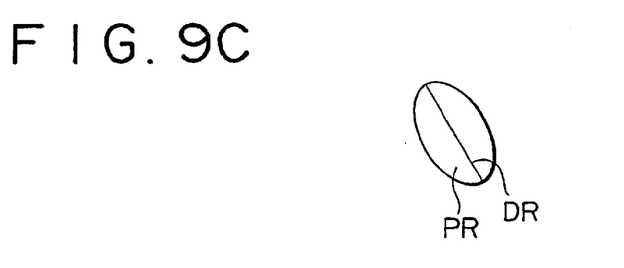
Figure 9D:
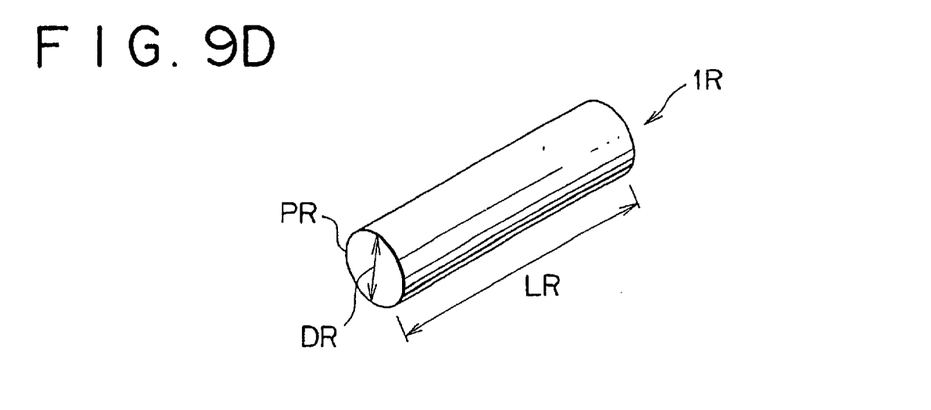

To help understand the present invention, Table 1 summarizes the results of examples. Comparative Example shows steps for forging the workpiece 1R having dimensions determined in the conventional way as shown in FIGS. 9(a) to 9(b). Working Example shows steps for forging the workpiece having the optimal cross-section and volume. Incidentally, steps 1 to 3 are intended for preforming and steps 4 to 8 are intended for forging; they are within the scope of the present invention.

TABLE 1

| Item | Unit | Comparative Example | Working Example |
|---|---|---|---|
| Alloy as raw material | | A6061 | A6061 |
| Dimensions of raw material | mm | 76φ × 470 | 76φ × 380 |
| Weight of raw material | kg | 5.8 | 4.6 |
| Weight of finished product | kg | 3.2 | 3.2 |
| Metal recovery of raw material | % | Approx. 55% | Approx. 70% |
| Step | | | |
| 1 Heating | ° C. | 450 | 450 |
| 2 Rolling | kW | 55 (roll drive motor) | 55 (roll drive motor) |
| 3 Bending | ton | 10 | 10 |
| 4 Buster | ton | 4000 | 2600 |
| 5 Trimming | ton | 200 | Not necessary |
| 6 Heating | ° C. | 450 | Not necessary |
| 7 Blocker | ton | 3000 | 2000 |

TABLE 1-continued

| | Unit | Comparative Example | Working Example |
|---|---|---|---|
| 8 Finisher | ton | 4000 | 2200 |
| 9 Trimming | ton | 200 | 200 |

It is noted from Table 1 that the pressing force for buster (step 4) is 4000 tons in Comparative Example and 2600 tons in Working Example. This considerable difference is because the workpiece 1 has an optimized volume. In addition, buster in Working Example gives so small an amount of flash as to eliminate the necessity for trimming (step 5). The omission of trimming permits the intermediate workpiece to remain hot enough to proceed to step 7 (blocker) directly without passing through step 6 (reheating).

It is also noted from Table 1 that the pressing force for blocker (step 7) is 3000 tons in Comparative Example and 2000 tons in Working Example and that the pressing force for finisher (step 8) is 4000 tons in Comparative Example and 2200 tons in Working Example. Force required for trimming is 200 tons in both Comparative Example and Working Example. Incidentally, the workpiece 1 with an optimized volume in Working Example reduced time for processing by the roll forming machine 10.

The workpiece 1 having an optimized sectional area and volume in working Example can be forged with a pressing force about 30–40% less than that in Comparative Example. This reduced pressing force increases the capacity of the pressing machine and extends the life of the press dies, which in turn reduces the running cost of the pressing machine. Moreover, the omission of step 5 (trimming) and step 6 (reheating) reduces the entire process time.

It is further noted from Table 1 that Comparative Example achieves metal recovery of only about 55% whereas Working Example achieves much improved metal recovery of about 70%. Metal recovery will be as high as about 80% if the suspension part has a simple shape which does not need step 3 for bending.

Now, the second embodiment of the present invention will be described below, in which the same constituents as in the first embodiment are given the same symbols without detailed explanation. The second embodiment demonstrates how to establish the actual dimensions for the workpiece 1 to be used to produce the suspension part 7 by forging. The procedure proceeds according to the flow sheet shown in FIG. 8.

Figure 8:
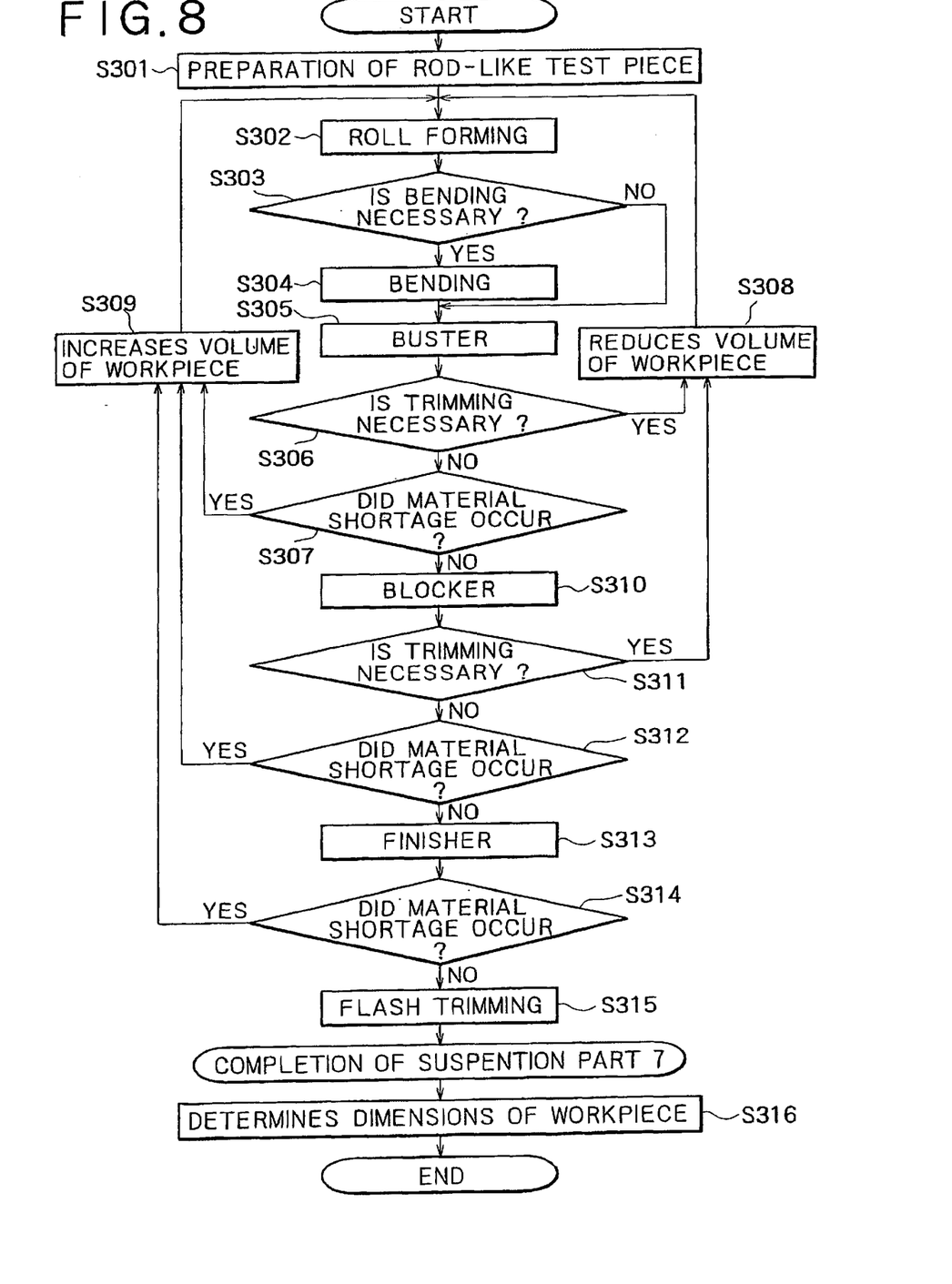
FIG. 8 is a flow chart for determining the dimensions of the workpiece for roll forming in one embodiment of the present invention.

Step S301 in FIG. 8 is intended for preparation of a rod-like test piece having dimensions determined according to the shape of the suspension part 7. In step S302, the test piece undergoes roll forming by the roll forming machine 10 shown in FIGS. 5(a) and 5 (b). Step S303 is designed to judge if bending is necessary as in the case of the first embodiment. If bending is necessary, "yes" is selected so that bending is carried out in step S304. If bending is not necessary, "no" is selected so that the flow proceeds to step S305 (for buster).

The test piece which has undergone buster in step S305 is examined for flash in step S306 and is also examined for material shortage in step S307. If a large amount of flash is found in step S305, "yes" is selected so that the flow proceeds to step S308 in which the volume of the workpiece is reduced. If no flash is found or if a little amount of flash is found but no trimming is necessary, then "no" is selected so that the flow proceeds to step S307.

If material shortage is found in step S307, the flow proceeds to step S309 so that the volume of the workpiece is increased. In the case where the volume of the workpiece is reduced in step S308 or increased in step S309, the flow returns to step S301 in which a new test piece having an altered volume is prepared, and steps S302 downward are carried out.

If the test piece which has undergone buster (in step S305) has flash within a limit and has no material shortage, then the flow proceeds to step S310 for blocker.

After blocker, the test piece is examined for flash in step S311 and for material shortage in step S312. If flash is found that needs trimming, "yes" is selected so that the volume of the workpiece is reduced in step S308. If material shortage is found, "yes" is selected so that the volume of the workpiece is increased in step S309, and the flow returns to step S301.

If trimming is not necessary ("no" is selected in step S311) and there is no material shortage ("no" is selected in step S312), then the flow proceeds to step S313 for finisher.

After step S313 for finisher, the test piece is examined for material shortage in step S314. If there is material shortage, "yes" is selected so that the flow returns to step S301 in which the volume of the workpiece is increased. If there is no material shortage, "no" is selected so that the flow proceeds to step S315 for final trimming. After trimming, the test piece takes on the final shape or the shape of the suspension part 7. In step S316, the dimensions of the thus obtained test piece are regarded as the dimensions of the workpiece 1 for roll forming.

The workpiece 1 with such dimensions undergoes steps S101 to S109 in FIG. 1 to be made into the suspension part 7 without the necessity of trimming after each step except for step 108 (for finisher). This contributes to improved metal recovery and efficiency.

Incidentally, the difference between the volume of the suspension part 7 and the volume of the test piece is the amount of flash. In this embodiment, the amount of flash is about 20–30% of the volume of the suspension part 7. This amount of flash is equivalent to the metal recovery of 70–80%.

In the case where a new roll-forming die is used, it might be necessary to correct the shape of the die. In this case, it is desirable to modify step S309 in FIG. 8 (for increasing workpiece volume) such that it judges the necessity of correcting the die. If the modified step judges that the die needs correction, then the die is corrected without increase in workpiece volume. If the modified step judges that the die does need correction, then the workpiece volume is increased. In either case, the entire steps starting from S301 are repeated for the new die or the new workpiece with corrected dimensions. Such additional step makes it possible to correct the die while determining the dimensions of the workpiece 1 for roll forming. Incidentally, it is also possible to modify step S308 (for decreasing workpiece volume) such that it judges the necessity of correcting the die.

The foregoing embodiments are not intended to restrict the scope of the present invention. Various changes and modifications may be made. For example, the cross-section of the workpiece 1 for roll forming may be square or oval instead of circular for easy forming.

In designing the shape of the workpiece 1 for roll forming, the order of the orthogonal cross-section Fn to be acquired may be arbitrary. In this case it is desirable that the three-dimensional CAD defines the circular truncated cone Tn and calculates the volume Vn after all the orthogonal cross-sections Fn have been acquired.

What is claimed is:

1. A method for producing suspension parts of aluminum alloy, said method comprising a step off preparing a workpiece for roll forming having prescribed dimensions, a step of heating said workpiece, a step of subjecting said workpiece, which has been heated, to roll forming, thereby giving a preformed workpiece, a step of subjecting said preformed workpiece to pressing or forging in multiple stages, thereby giving a formed product, and a step of subjecting the formed product to trimming, wherein said trimming is carried out only after the above-mentioned pressing in multiple stages has been completed, wherein the prescribed dimensions are determined by steps of establishing an imaginary center line in the suspension part of aluminum alloy, acquiring plural orthogonal cross-sections perpendicular to the imaginary center line so as to be arranged along the imaginary center line, calculating a sectional area of the cross-sections, defining imaginary circles each having an imaginary area which is equal to the sectional area of the orthogonal cross-section plus a preliminarily established amount of flash, defining the imaginary area between said imaginary circles by interpolation, integrating said imaginary areas, thereby calculating the imaginary total volume of the suspension part of aluminum alloy, and obtaining the sectional area of the workpiece of roll forming based on the imaginary circle having the maximum area among said imaginary circles and dividing said total volume by said sectional area, thereby giving a value which is regarded as the length of the workpiece for roll forming.

2. The method for producing suspension parts of aluminum alloy as defined in claim 1, wherein the step of defining the imaginary area between said imaginary circles by interpolation is carried out such that a circular truncated cone is formed between adjacent two imaginary circles.

3. The method for producing suspension parts of aluminum alloy as defined in claim 1, wherein the sectional area of the workpiece for roll forming is the maximum value of said imaginary area multiplied by a prescribed factor.

4. The method for producing suspension parts of aluminum alloy as defined in claim 3, wherein the prescribed factor is 0.7 to 1.0.

5. The method for producing suspension parts of aluminum alloy as defined in claim 1, wherein the amount of flash is the value calculated by multiplying the area of the orthogonal cross-section by a prescribed factor.

6. The method for producing suspension parts of aluminum alloy as defined in claim 5, wherein the prescribed factor is 0.05 to 0.3.

7. The method for producing suspension parts of aluminum alloy as defined in claim 1, wherein the steps to determine said prescribed dimensions are carried out by using three-dimensional CAD data for the suspension part of aluminum alloy.

8. A method for producing suspension parts of aluminum alloy, said method comprising a step off preparing a workpiece for roll forming having prescribed dimensions, a step of heating said workpiece, a step of subjecting said workpiece, which has been heated, to roll forming, thereby giving a preformed workpiece, a step of subjecting said preformed workpiece to pressing or forging in multiple stages, thereby giving a formed product, and a step of subjecting the formed product to trimming, wherein said trimming is carried out only after the above-mentioned pressing in multiple stages has been completed, wherein the prescribed dimensions are determined by multiple steps of preparing a test piece having the volume of the workpiece, subjecting the test piece to preforming by actual roll forming and pressing or forging in multiple stages, decreasing the volume of the workpiece by a certain amount if trimming is necessary in the series of steps and subjecting the test piece again to preforming by actual roll forming and pressing or forging in multiple stages, increasing the volume of the workpiece by a certain amount if trimming is necessary in the series of steps and subjecting the test piece again to preforming by actual roll forming and pressing or forging in multiple stages, and repeating said steps until the prescribed conditions are satisfied.

9. A method for producing suspension parts of aluminum alloy, said method comprising a step off preparing a workpiece for roll forming having prescribed dimensions, a step of heating said workpiece, a step of subjecting said workpiece, which has been heated, to roll forming, thereby giving a preformed workpiece, a step of subjecting said preformed workpiece to pressing or forging in multiple stages, thereby giving a formed product, and a step of subjecting the formed product to trimming, wherein said trimming is carried out only after the above-mentioned pressing in multiple stages has been completed, wherein pressing or forging in multiple stages is carried out simultaneously by using dies which are arranged side by side and mounted on the same pressing machine.

* * * * *